(12) United States Patent
Bickard et al.

(10) Patent No.: US 10,953,709 B2
(45) Date of Patent: Mar. 23, 2021

(54) STANDALONE ON-BOARD PRESSURE MEASUREMENT DEVICE, AND PRESSURE MEASUREMENT METHOD

(71) Applicant: SAFRAN ELECTRONICS & DEFENSE, Boulogne-Billancourt (FR)

(72) Inventors: Thierry Bickard, Boulogne-Billancourt (FR); Nicolas Fanton, Boulogne-Billancourt (FR); Emmanuel Couturier, Boulogne-Billancourt (FR)

(73) Assignee: Safran Electronics & Defense, Boulogne-Billancourt (FR)

( * ) Notice: Subject to any disclaimer, the term of this patent is extended or adjusted under 35 U.S.C. 154(b) by 0 days.

(21) Appl. No.: 16/763,316

(22) PCT Filed: Nov. 13, 2018

(86) PCT No.: PCT/EP2018/081131
§ 371 (c)(1),
(2) Date: May 12, 2020

(87) PCT Pub. No.: WO2019/101583
PCT Pub. Date: May 31, 2019

(65) Prior Publication Data
US 2020/0290411 A1    Sep. 17, 2020

(30) Foreign Application Priority Data

Nov. 27, 2017  (FR) ...................................... 17 61238

(51) Int. Cl.
*B60C 23/04*    (2006.01)

(52) U.S. Cl.
CPC ........ *B60C 23/0488* (2013.01); *B60C 23/041* (2013.01); *B60C 23/0459* (2013.01)

(58) Field of Classification Search
CPC ............ B60C 23/0488; B60C 23/0486; B60C 23/0459; B60C 23/0455; B60C 23/0447; B60C 23/0433; B60C 23/0422; B60C 23/0408
See application file for complete search history.

(56) References Cited

U.S. PATENT DOCUMENTS

| 6,278,363 | B1 * | 8/2001 | Bezek | B60C 23/0416 |
| | | | | 340/442 |
| 8,723,661 | B2 * | 5/2014 | Sham | B60C 23/0491 |
| | | | | 340/447 |

(Continued)

FOREIGN PATENT DOCUMENTS

AU    2011247846 A1    12/2011

*Primary Examiner* — Nathaniel J Kolb
(74) *Attorney, Agent, or Firm* — Muncy, Geissler, Olds & Lowe, P.C.

(57) ABSTRACT

A wheel comprising a rim carrying a tire that co-operates with the rim to define an inside volume, the wheel comprising a pressure measurement device comprising an electronic control circuit that is connected to a pressure sensor, to an absence-of-movement sensor for sensing that the wheel is not moving and to an electronic circuit for wireless communication, the pressure measurement device being arranged to cause pressure to be measured while the wheel is detected as not moving. A pressure measurement device and an associated measurement method.

21 Claims, 4 Drawing Sheets

(56) References Cited

U.S. PATENT DOCUMENTS

| | | | | |
|---|---|---|---|---|
| 8,742,912 B2* | 6/2014 | Blanchard | ............ | B60C 23/041 340/442 |
| 2010/0164705 A1* | 7/2010 | Blanchard | ........... | B60C 23/0411 340/442 |
| 2013/0106597 A1* | 5/2013 | Sham | ................. | B60C 23/0491 340/447 |
| 2013/0312509 A1* | 11/2013 | Solomon | ................ | G01L 17/00 73/146.4 |
| 2015/0226624 A1* | 8/2015 | Kuisma | ................ | G01L 9/0072 73/724 |

* cited by examiner

STANDALONE ON-BOARD PRESSURE MEASUREMENT DEVICE, AND PRESSURE MEASUREMENT METHOD

FIELD OF THE INVENTION

The present invention relates to measuring pressure, and more particularly to measuring pressure in an aircraft wheel.

BACKGROUND OF THE INVENTION

Conventionally, an aircraft wheel comprises a cylindrical rim carrying a tire co-operating with the rim to define an inside volume that is filled with a fluid under pressure, generally air. After each landing, the pressure of the air contained in the wheel is measured by using a pressure measurement device mounted on the inflation valve secured to the rim. The rim generally contains a stack of brake disks called a heat pack that gives off a significant amount of heat when braking the aircraft (temperatures higher than 500 degrees Celsius). This heat requires the use of specific materials and assembly techniques, which make the manufacture of such a pressure sensor very expensive. Furthermore, the exposure of the sensor to high temperature while taking a measurement disturbs the accuracy of the measurement.

OBJECT OF THE INVENTION

The object of the invention is to improve the accuracy of a pressure measurement device.

SUMMARY OF THE INVENTION

To this end, the invention provides a vehicle wheel, the wheel comprising a rim carrying a tire co-operating with the rim to define an inside volume that is filled with a fluid under pressure, the wheel including a pressure measurement device mounted so as to be capable of moving freely in the inside volume. The pressure measurement device comprises an electronic control circuit that is connected to a pressure sensor, to an absence-of-movement sensor for sensing when the wheel is not moving, and to an electronic circuit for wireless communication. The pressure measurement device is arranged to cause pressure to be measured while the wheel is detected as not moving.

A device is thus obtained that is not subjected to the heat of the heat pack and that takes a pressure measurement while it is certain that it is as far as possible away from the heat pack. The pressure sensor of the measurement device may thus comprise components that are less capable of withstanding high temperatures than in the prior art and that provide improved accuracy. Since the temperatures to which the measurement device is exposed while taking a measurement are lower, temperature compensation of the measurement need not exist, or can be limited, thereby resulting in improved accuracy for the pressure measurement taken by the device of the invention.

Detecting that the wheel is not moving is particularly effective when the absence-of-movement sensor comprises an accelerometer.

Manufacturing costs are improved when the means for wireless communication comprise a Bluetooth transceiver and/or a radio frequency identification (RFID) tag and/or a radio transceiver tuned to the industrial, scientific, and medical frequency bands.

Temperature compensation may be performed, thereby improving the accuracy of the pressure measurement, when the pressure measurement device includes a temperature sensor for sensing the temperature of the fluid under pressure.

The endurance of the measurement device is greatly improved when the pressure measurement device includes means for recovering kinetic energy.

Advantageously, the pressure measurement device includes a data storage memory.

The robustness of the measurement device is improved when the device includes an outer shell extending around a housing containing at least one electronic card.

Inexpensive manufacture is obtained when the outer shell is substantially spherical in shape.

Pressure can be measured in a hostile medium when the outer shell defines a hermetically sealed inside volume, and the pressure measurement device includes a strain gauge secured to an inside surface of the outer shell and connected to the electronic card. Alternatively, the outer shell defines an inside volume and includes at least one orifice for admitting the fluid under pressure. The pressure measurement device then includes a pressure measurement sensor in the inside volume.

The invention also provides a pressure measurement device for placing in a vehicle wheel of the invention.

The invention also provides a method of measuring pressure in a vehicle wheel by using a measurement device of the invention, the method comprising the following steps:
a) detecting that the pressure measurement device has not been moving for a predetermined duration;
b) measuring the pressure of the inside volume; and
c) using the electronic circuit for wireless communication to send a measured pressure value.

BRIEF DESCRIPTION OF THE DRAWINGS

Reference is made to the accompanying figures, in which.

DETAILED DESCRIPTION OF THE INVENTION

Figure 1:
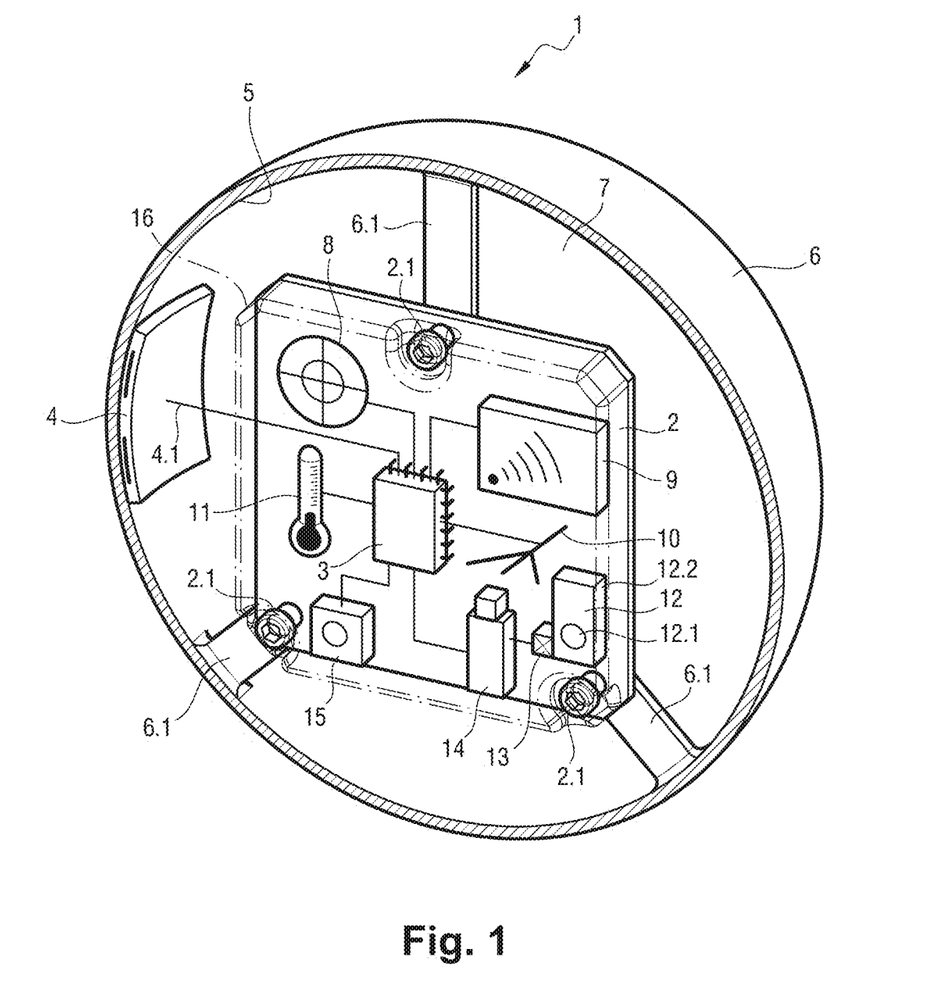
FIG. 1 is a diagrammatic perspective view of a section of a pressure measurement device in a first embodiment of the invention.

With reference to FIG. 1, the pressure measurement device of the invention, given overall reference 1, comprises an electronic card 2 on which a microcontroller 3 is welded. The microcontroller 3 is connected by a wire 4.1 to a resistive electromechanical nanosystem for measuring pressure, in this example a strain gauge 4 bonded to the inside surface 5 of a substantially spherical outer shell 6 that extends around the electronic card 2. In this example, the outer shell 6 is made of synthetic rubber and it defines a hermetically sealed inside volume 7. The outer shell 6 is connected to the electronic card 2 by three resilient links 6.1 extending from the inside surface 5 to fastening points 2.1 where they are screwed to the electronic card 2.

The electronic card 2 also receives an accelerometer 8, an RFID tag 9, and a radio transceiver 10 that can tune to the industrial, scientific, and medical frequency bands and to global system for mobile communication (GSM) type network bands. The industrial, scientific, and medical frequency bands are defined in Europe by the standard EN 55011 and by the radio equipment directive (RED), and they make communication possible over long distances at low data rates. In the United States, these bands are defined by parts 15 and 18 of title 47 of the Code of Federal Regulations. These frequency bands are generally used in applications for the so-called "Internet of things" (IoT). The pressure measurement device 1 also includes a resistive temperature probe 11, and a kinetic energy recovery unit 12 comprising a converter 13 that converts the kinetic energy it captures into electrical energy and sends it to a battery 14. In this example, the energy recovery unit 12 comprises a ball 12.1 made of ferromagnetic material that can move freely in the air gap of a coil 12.2.

The accelerometer 8, the RFID tag 9, the radio transceiver 10, the temperature probe 11, the recovery unit 12, and the battery 14 are secured to the electronic card 2 and they are connected to the microcontroller 3. The electronic card 2 also carries a static random access memory (SRAM) module 15 connected to the microcontroller 3.

The electronic card 2 and its components are embedded in a phenolic resin that, on hardening, provides a protective housing 16 for the electronic card 2, with the fastener points 2.1 being left accessible.

Figure 2:
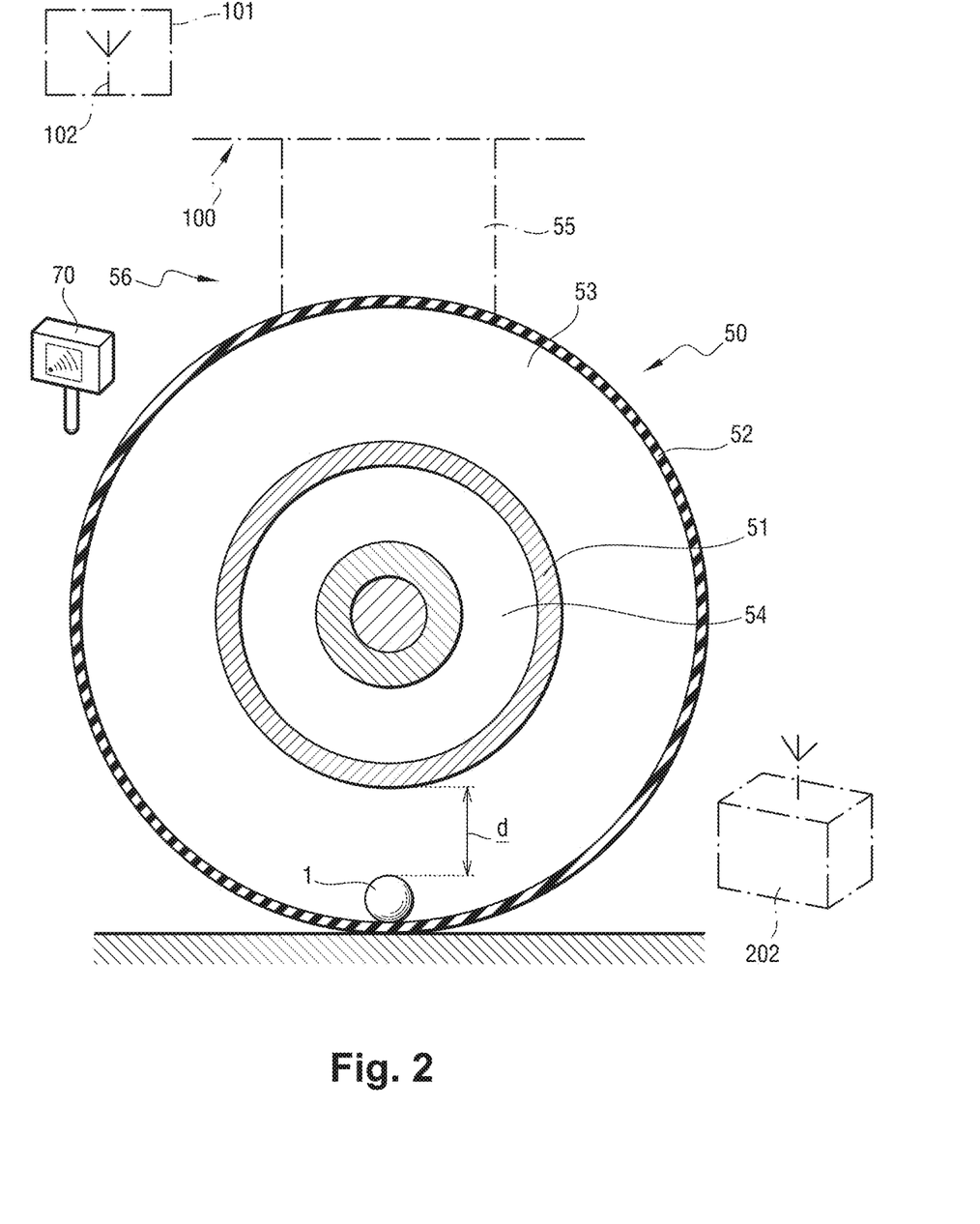
FIG. 2 is a diagrammatic section view of a vehicle wheel in a first embodiment of the invention.

As can be seen in FIG. 2, the pressure measurement device is placed in a wheel 50 of an aircraft 100. The wheel 50 comprises a rim 51 having a tire 52 mounted thereon. The tire 52 co-operates with the rim 51 to define an inside volume 53 of the wheel 50 that is filled with air under pressure. The pressure measurement device 1 is placed inside the tire 52 when the tire is fitted on the rim 51. The pressure measurement device 1 is mounted loose in the inside volume 53, i.e. there is no link between the pressure measurement device 1 and the rim 51 and/or the tire 52. The device can move inside the inside volume 53 independently of the movement of the wheel 50. As is generally the case, the rim 51 is substantially cylindrical and it houses a heat pack 54 comprising a stack of brake disks connected in alternation to the rim 51 and to a stationary element of a leg 55 of an undercarriage 56 that carries the wheel 50.

The avionics equipment 101 of the aircraft 100 includes a radio transceiver 102 tuned in to the transmission/reception frequencies of the transceiver 10 of the pressure measurement device 1.

Figure 3:
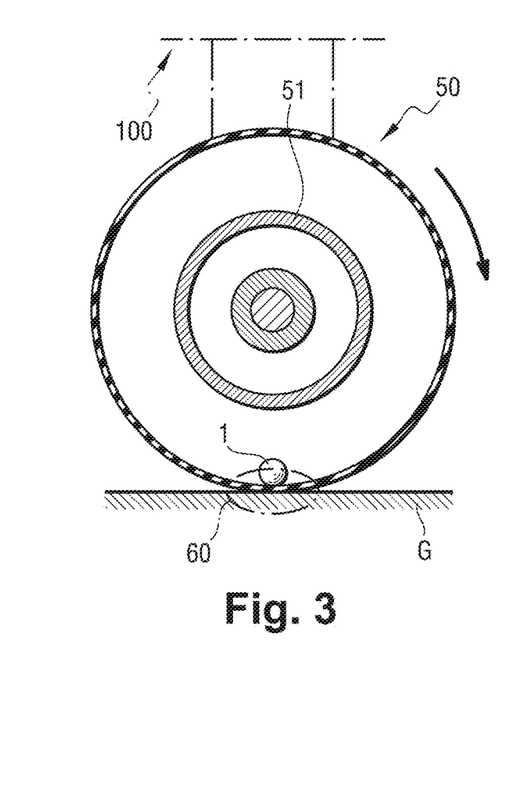
FIGS. 3 to 5 are diagrammatic section views of the FIG. 2 wheel in various dynamic configurations.
Figure 4:
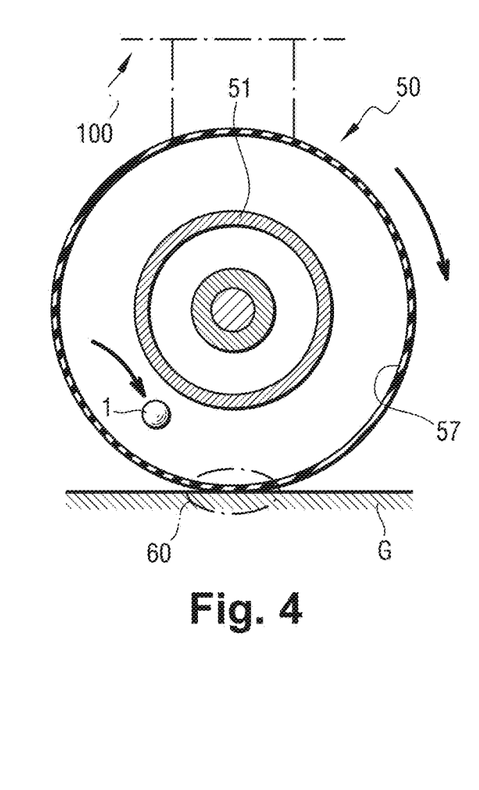
Figure 5:
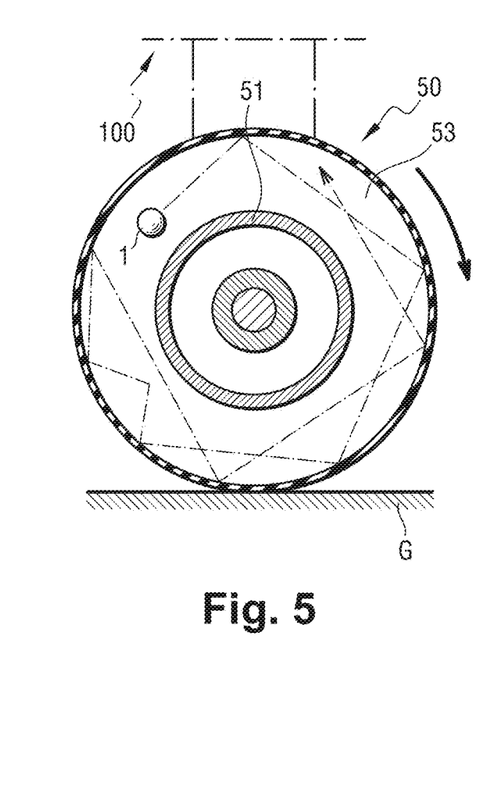

In operation, and with reference to FIGS. 3 to 5, the pressure measurement device 1 is activated on being put into place in the wheel 50 of the aircraft 100 when the tire 52 is placed on the rim 51 during a maintenance operation. While the aircraft 100 is taxiing and while still on the ground during takeoff, the wheel 50 rotates, and, depending on the speed of rotation of the wheel 50, the pressure measurement device 1 remains in the bottom portion of the wheel 50 rolling in the proximity of the zone 60 where the wheel 50 is in contact with the ground G (FIG. 3). As the speed of rotation of the wheel 50 increases, the pressure measurement device 1 is entrained successively by the inside surface 57 of the tire 53 prior to dropping back into the zone 60 (FIG. 4). At very high speed, the pressure measurement device 1 bounces against the inside surface 57 of the tire 52 and moves in the inside volume 53. The pressure measurement device 1 can also become pressed against the inside surface 57 of the tire 52 while the tire is rotating (FIG. 5). While the wheel 50 is rotating, the accelerometer 8 detects that the wheel 50 is moving, and the recovery unit 12 converts the kinetic energy to which the pressure measurement device 1 is being subjected into electrical energy that is stored by the battery 14. During these movements, the measurement device 1 is only exceptionally in prolonged contact with the rim 51.

While in flight, the accelerometer 8 detects that the wheel is not moving. The microcontroller 3 then begins to count down a predetermined duration T as stored in the memory module 15, and in this example a duration of thirty minutes. At the end of this countdown, the microcontroller 3 reads the measurements of the strain gauge 4 and of the temperature probe 11. The microcontroller 3 makes use of the strain gauge 4 and transforms the strain of the outer shell 6 that is subjected to the pressure difference between the inside volume 7 of the pressure device 1 and the inside volume 53 of the wheel 50 into a measurement of the pressure of the air in the inside volume 53. The microcontroller 3 then performs temperature compensation on the pressure measurement by using the measurement from the temperature probe 11 and by consulting a table for compensating the drift of the strain gauge 4 as a function of temperature, as stored in the SRAM memory module 15. Thereafter, the microcontroller 3 uses the radio transceiver 10 to transmit the pressure value of the wheel 50 to the radio transceiver 102 of the aircraft 100. The microcontroller 3 then encodes the pressure value of the wheel 50 into the appropriate format and stores it in the RFID tag 9. Thereafter, the microcontroller 3 causes the measurement device 1 to be put to sleep. While it is asleep, the energy consumed by the device is limited solely to monitoring the accelerometer 8.

Advantageously, the accelerometer 8 can detect the movement of the aircraft 100 while it is in flight so as not to measure pressure or transmit the measurement. While wheel 50 is not moving, the pressure measurement device 1 is subjected to gravity, and it rests on the lowest point of the wheel 50, i.e. at a distance $\underline{d}$ from the rim 51.

While the aircraft 100 is landing, the pressure device 1 is subjected to the rotation of the wheel 50 and it moves freely in the inside volume 53 of the tire 52. During rotation of the wheel 50, the accelerometer 8 detects that the wheel 50 is moving, and the recovery unit 12 converts the kinetic energy to which the pressure measurement device 1 is being subjected into electrical energy that is stored by the battery 14.

During these movements, the measurement device 1 is only exceptionally in prolonged contact with the rim 51.

Once the aircraft has stopped, the accelerometer 8 detects that the wheel 50 is not moving. The microcontroller 3 then begins to count down a predetermined duration T as stored in the memory module 15, and in this example a duration of thirty minutes. At the end of this countdown, the microcontroller 3 reads the measurements of the strain gauge 4 and of the temperature probe 11. The microcontroller 3 makes use of the strain gauge 4 and transforms the strain of the outer shell 6 that is subjected to the pressure difference between the inside volume 7 of the pressure device 1 and the inside volume 53 of the wheel 50 into a measurement of the pressure of the air in the inside volume 53. The microcontroller 3 then performs temperature compensation on the pressure measurement by using the measurement from the temperature probe 11 and by consulting a table for compensating the drift of the strain gauge 4 as a function of temperature, as stored in the SRAM memory module 15. Thereafter, the microcontroller 3 uses the radio transceiver 10 to transmit the measurement of the pressure of the wheel 50 to the radio transceiver 102 of the aircraft 100. This transmission of the measurement of the pressure of the wheel 50 may also be sent to a radio receiver 202 of a maintenance platform 200 at the site where the aircraft 100 is parked, generally an airport. This makes it possible to avoid maintenance operators visiting the wheel 50, and ensures that the wheel 50 is tracked automatically. A second transmission may also be made by the transceiver 10 over the GSM frequency band so as to enable a remote platform to track the wheel 50. The microcontroller 3 then encodes the pressure value of the wheel 50 into the appropriate format and stores it in the RFID tag 9. The microcontroller then puts the pressure measurement device 1 to sleep.

During an inspection visit of the wheel 50, the pressure can be inspected on request by using an RFID tag reader 70. The operator brings an RFID tag reader 70 up to the wheel 50. In response to the reader 70, the RFID tag 9 sends it the pressure value of the wheel 50, which is then read by the RFID reader 70. A pressure measurement device 1 is thus obtained that measures pressure while always being as far away as possible from the heat pack 54. This makes it possible to use the pressure sensor 4 over a range of temperatures in which the influence of temperature on the pressure sensor 4 is limited, or easy to compensate. The components of the pressure measurement device 1 are subjected to lower temperatures, and they can therefore be selected from ranges that are less expensive than components of the prior art. The mechanical stresses resulting from centrifugal force acting on the pressure measurement device 1 are also small and also allow components to be used that are less expensive than those of the prior art. The measurement device 1 is thus less expensive and more accurate than presently-existing solutions.

In the following description of a second embodiment of the invention, elements that are identical or analogous to those described above are given identical numerical references.

Figure 6:
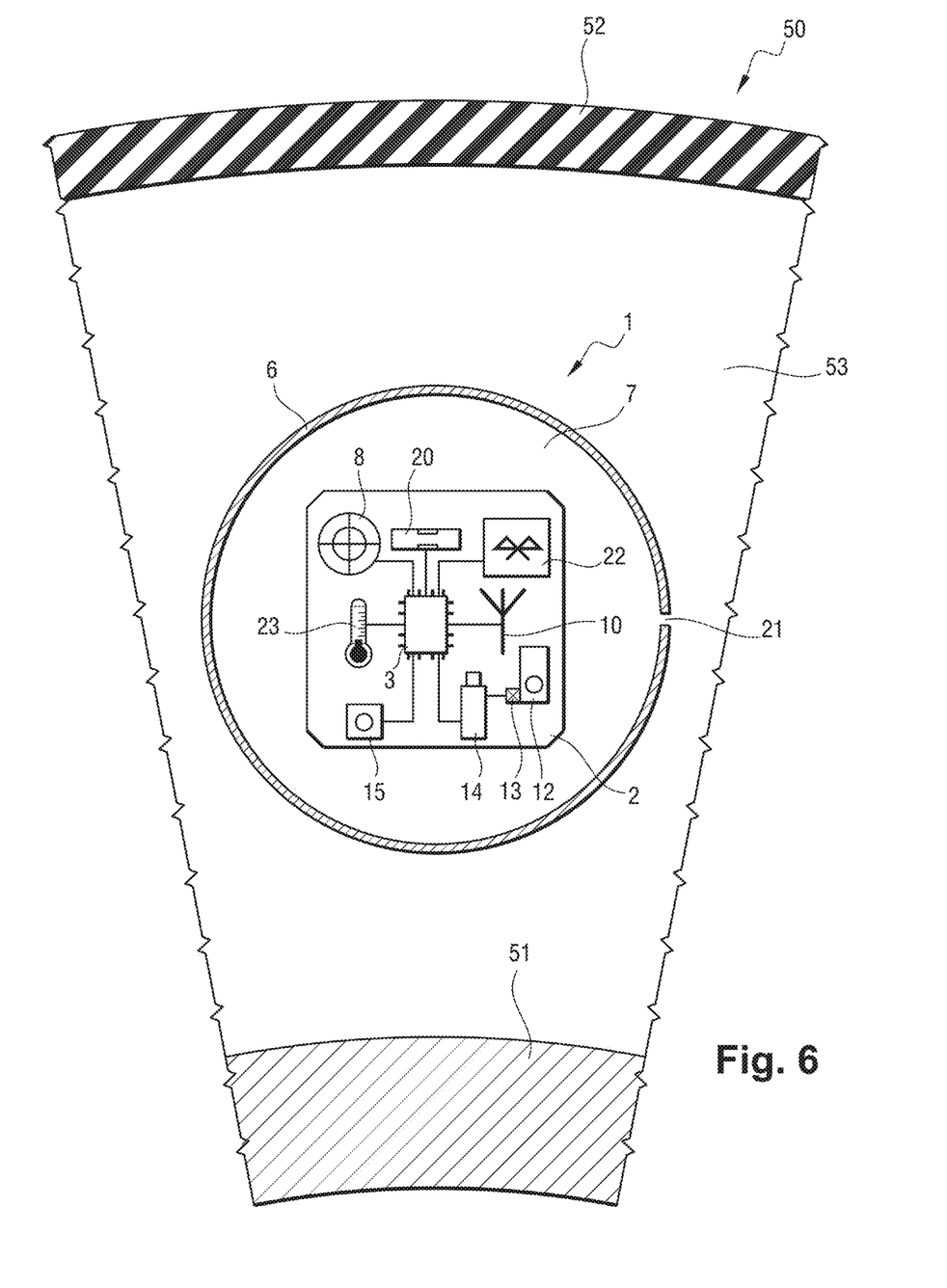
FIG. 6 is a fragmentary diagrammatic section view of a vehicle wheel in a second embodiment of the invention.

With reference to FIG. 6, the measurement device 1 in the second embodiment of the invention comprises an electronic card 2 having welded thereon a microcontroller 3 and a pressure-measuring electromechanical microsystem, specifically a capacitive pressure sensor 20. The outer shell 6 includes an orifice 21 for admitting fluid into the inside volume 7. In this example, the electronic card 2 is mounted loose, i.e. it is capable of moving freely in the inside volume 7. The electronic card 2 also receives an accelerometer 8, a Bluetooth transceiver 22, and a radio transceiver 10 that can tune to the industrial, scientific, and medical frequency bands and to GSM type network bands. The pressure measurement device 1 also includes a thermocouple 23, and a kinetic energy recovery unit 12 comprising a converter 13 that converts the kinetic energy it captures into electrical energy and sends it to a battery 14.

The capacitive pressure sensor 20, the accelerometer 8, the Bluetooth transceiver 22, the radio transceiver 10, the temperature probe 11, the recovery unit 12, and the battery 14 are secured to the electronic card 2 and they are connected to the microcontroller 3. The electronic card 2 also carries an SRAM memory module 15 connected to the microcontroller 3.

The electronic card 2 and its components are embedded in a phenolic resin that, on hardening, provides a protective housing 16 for the electronic card 2.

When the pressure measurement device 1 is placed in a wheel 50 of an aircraft 100, the air under pressure that occupies the inside volume 53 of the wheel 50 penetrates into the inside volume 7 of the pressure measurement device 1 through the orifice 21. The pressure in the inside volume 7 of the pressure measurement device 1 is then equal to the pressure in the inside volume 53 of the wheel 50. This pressure is measured by the capacitive pressure sensor 20 and it is delivered to the microcontroller 3.

Operation of the pressure measurement device 1 in the second embodiment of the invention is identical to that described above. The Bluetooth transceiver 22 provides easy wireless communication of the value of the pressure of the wheel to common mobile communication equipment of the smartphone type.

Naturally, the electronic card 2 could be secured to the outer shell 6, as in the first embodiment of the invention.

Naturally, the invention is not limited to the embodiments described, but covers any variant coming within the ambit of the invention as defined by the claims.

In particular;

although above, the pressure measurement device includes a microcontroller, the invention applies equally well to other types of electronic control circuit, e.g. such as a field programmable gate array (FPGA), logic gates, or a microprocessor;

although above, the microcontroller and the other components are welded to the electronic card, the invention applies equally to other means for connecting the components to the control circuit, e.g. such as connections via pins, by sintering, or by soldering on a printed circuit board (PCB) type support, or to components connected by wires;

although above, the strain gauge is connected by wire to the microcontroller, the invention applies equally well to wireless connections between the various components of the pressure measurement device;

although above, the device includes a pressure measurement nanosystem or a pressure measurement microsystem, the invention applies equally well to other types of pressure sensor, e.g. such as resistive, inductive, capacitive, or Hall effect sensors that may be nanometric, micrometric, millimetric, or of any type;

although above, the strain gauge is adhesively bonded to the inside face of the outer shell of the pressure measurement device, the invention applies equally well to other means of securing the pressure gauge to the outside shell, e.g. such as applying resin, ultrasonic welding, or staking;

although above, the outer shell is substantially spherical in shape, the invention applies equally well to other shapes for the outer shell, e.g. such as an egg shape, any shape that facilitates rolling of the device in the inside volume of the wheel, or any other shape. The invention also applies to a pressure measurement device that does not have an outer shell;

although above, the outer shell is made of synthetic rubber, the invention applies equally well to shell made of other materials, e.g. such as natural rubber, ethylene-propylene-diene monomer (EPDM), polymers, carbon/Kevlar composites, stainless steel, or any other material;

although above, the electronic card is connected to the outer shell by three resilient links, the invention applies equally well to an electronic card connected by a single link, by two links, or by three links, which links need not necessarily be resilient, and invention applies equally well to an electronic card that is mounted loose inside the outer shell;

although above, the measurement device includes an accelerometer, the invention applies equally well to other types of sensors for sensing absence of movement, e.g. such as an inertial unit, a gyro, one or more pendulums, one or more switches actuated by gravity;

although above, the pressure measurement device includes an RFID tag, the invention applies equally well to other types of passive technologies for short range transmission, such as for example by using a protocol for near field communication (NFC);

although above, the pressure measurement device includes a Bluetooth transceiver, the invention applies equally well to other types of active technologies for short range transmission, e.g. such as Wi-Fi or ultrasound technologies;

although above, the pressure measurement device includes a radio transceiver capable of tuning the two GSM type wavebands, the invention applies equally well to other types of technique for transmission over a public network, e.g. such as using a protocol of 2G, 3G, 4G, 5G, LoRa or edge type or of a type derived from the IEEE 802.15.4 standard;

although above, the pressure measurement device includes a resistive temperature probe, the invention applies equally well to other types of sensors for sensing the temperature of the fluid under pressure in the wheel, e.g. such as a thermocouple or an infrared pyrometer;

although above, the pressure measurement device includes an inductive kinetic energy converter, the invention applies equally well to other types of energy converter, e.g. such as a kinetic energy converter of piezoelectric type or a thermal energy converter;

although above, although the pressure measurement device includes an SRAM memory, the invention applies equally well to other types of data storage memory, e.g. such as a memory of dual-ported random access memory (DPRAM), multi-mode access memory (MAM), or parameter random access memory (PRAM) type, a hard disk, or an electrically erasable programmable read-only memory (EEPROM);

although above, the pressure measurement device includes a housing made of phenolic resin, the invention applies equally well to other types of housing, e.g. such as a housing made of metal, of composite or carbon fiber, or of epoxy resin, etc.;

although above, the measurement device is placed in an aircraft wheel, the invention applies equally well to wheels of other types of vehicle, e.g. such as trucks or cars;

although above, the tire is filled with compressed air, the invention applies equally well to tires filled with other types of fluid under pressure, e.g. such as gases or liquids; and although above, the predetermined duration at the end of which the pressure is measured is thirty minutes, the invention applies equally well to other durations of greater or shorter length.

The invention claimed is:

1. A vehicle wheel for a vehicle, the wheel comprising a rim carrying a tire co-operating with the rim to define an inside volume that is filled with a fluid under pressure, the wheel including a pressure measurement device inserted into the inside volume so as to be capable of moving freely in the inside volume, the pressure measurement device comprising an electronic control circuit that is connected to a pressure sensor, to an absence-of-movement sensor for sensing when the wheel is not moving, and to an electronic circuit for wireless communication, the pressure measurement device being arranged to cause pressure to be measured only while the wheel is detected as not moving.

2. The vehicle wheel according to claim 1, wherein the absence-of-movement sensor comprises an accelerometer.

3. The vehicle wheel according to claim 1, wherein the electronic circuit for wireless communication comprises a Bluetooth transceiver, an RFID tag, or a radio transceiver tuned to industrial, scientific, and medical frequency bands.

4. The vehicle wheel according to claim 1, wherein the pressure measurement device includes a temperature sensor for sensing a temperature of the fluid under pressure.

5. The vehicle wheel according to claim 1, wherein the pressure measurement device includes means for recovering kinetic energy.

6. The vehicle wheel according to claim 1, wherein the pressure measurement device includes a data storage memory.

7. The vehicle wheel according to claim 1, wherein the pressure measurement device includes an outer shell extending around a housing containing at least one electronic card.

8. The vehicle wheel according to claim 7, wherein the outer shell is substantially spherical in shape.

9. The vehicle wheel according to claim 7, wherein the outer shell defines a hermetically sealed inside volume, the pressure measurement device comprises a strain gauge secured to an inside surface of the outer shell and connected to the electronic card.

10. The vehicle wheel according to claim 7, wherein the outer shell defines an inside volume and includes at least one orifice for admitting the fluid under pressure, the pressure measurement device comprises a pressure measurement sensor in the inside volume.

11. A pressure measurement device for placing in a vehicle wheel comprising an electronic control circuit that is connected to a pressure sensor, to an absence-of-movement sensor for sensing when the wheel is not moving, and to an electronic circuit for wireless communication, the pressure measurement device being configured to cause pressure to be measured only while the wheel is detected as not moving.

12. A method of measuring pressure in a vehicle wheel using a measurement device according to claim 1, the method comprising the following steps:
   a) detecting that the pressure measurement device has not been moving for a predetermined duration;
   b) measuring the pressure of the inside volume; and
   c) using the electronic circuit for wireless communication to send a measured pressure value.

13. The pressure measurement device according to claim 11, wherein the absence-of-movement sensor comprises an accelerometer.

14. The pressure measurement device according to claim 11, wherein the electronic circuit for wireless communication comprises a Bluetooth transceiver, an RFID tag or a radio transceiver tuned to industrial, scientific, and medical frequency bands.

15. The pressure measurement device according to claim 11, wherein the pressure measurement device includes a temperature sensor for sensing a temperature of the fluid under pressure.

16. The pressure measurement device according to claim 11, wherein the pressure measurement device includes means for recovering kinetic energy.

17. The pressure measurement device according to claim 11, wherein the pressure measurement device includes a data storage memory.

18. The pressure measurement device according to claim 11, wherein the pressure measurement device includes an outer shell extending around a housing containing at least one electronic card.

19. The pressure measurement device according to claim 18, wherein the outer shell is substantially spherical in shape.

20. The pressure measurement device according to claim 18, wherein the outer shell defines a hermetically sealed inside volume, the pressure measurement device comprises a strain gauge secured to an inside surface of the outer shell and connected to the electronic card.

21. The pressure measurement device according to claim 18, wherein the outer shell defines an inside volume and includes at least one orifice for admitting the fluid under pressure, the pressure measurement device comprises a pressure measurement sensor in the inside volume.

\* \* \* \* \*